(12) United States Patent
Hassell et al.

(10) Patent No.: US 6,269,149 B1
(45) Date of Patent: Jul. 31, 2001

(54) SYSTEM AND METHOD FOR ENHANCING A COMMUNICATION LINK

(75) Inventors: Suzanne Hassell, Clearwater; Vincent Ciletti; Peter Calderon, both of Palm Harbor, all of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 08/850,174

(22) Filed: May 2, 1997

Related U.S. Application Data
(60) Provisional application No. 60/034,450, filed on Dec. 30, 1996.

(51) Int. Cl.[7] .............................. H04M 1/24; H04M 3/08; H04M 3/22
(52) U.S. Cl. ............................. 379/1; 379/201; 379/207; 379/208
(58) Field of Search ......................... 379/1–2, 10, 15–16, 379/45–46, 48, 127, 142, 201, 221, 279, 215, 207–209

(56) References Cited

U.S. PATENT DOCUMENTS

| | | | |
|---|---|---|---|
| 4,731,825 | * | 3/1988 | Wojcinski et al. ........... 379/16 |
| 4,811,380 | * | 3/1989 | Spear . |
| 5,185,779 | * | 2/1993 | Dop et al. ................. 379/33 |
| 5,280,541 | * | 1/1994 | Marko et al. . |
| 5,323,444 | * | 6/1994 | Ertz et al. ................ 379/142 |
| 5,532,939 | * | 7/1996 | Psinakis et al. ............ 379/111 |
| 5,544,224 | * | 8/1996 | Jonsson et al. . |
| 5,602,908 | * | 2/1997 | Fan ....................... 379/142 |
| 5,619,561 | * | 4/1997 | Reese ..................... 379/142 |
| 5,754,636 | * | 5/1998 | Bayless et al. ............. 379/142 |
| 5,771,281 | * | 6/1998 | Batten .................... 379/142 |
| 5,812,656 | * | 9/1998 | Garland et al. ............. 379/208 |
| 6,005,870 | * | 12/1999 | Leung et al. ............... 370/466 |

FOREIGN PATENT DOCUMENTS
0526240 * 2/1993 (EP) .

* cited by examiner

Primary Examiner—Duc Nguyen
(74) Attorney, Agent, or Firm—Thomas, Kayden, Horstemeyer & Risley LLP

(57) ABSTRACT

A system and method providing robust and secure communications connection in a telecommunication network are disclosed. The system and method include aspects directed to the establishment of a backup link in the event of a network fault, security, and call prioritization. Each of these features are uniquely achieved by utilizing caller identification information identifying the calling party. The method for establishing a backup communications link for rerouting data in a telecommunication network includes the steps of establishing a primary communications link between a calling party and a called party, and examining call setup information at the called party to identify the telephone number of the calling party. Thereafter, the method stores the telephone number of the calling party, and identifies a fault condition in the communication link between the calling party and the called party. It then retrieves the stored telephone number of the calling party by the called party. Using the retrieved telephone number to dial the calling party back, the method then establishes a backup communications link.

17 Claims, 11 Drawing Sheets

SYSTEM AND METHOD FOR ENHANCING A COMMUNICATION LINK

CROSS-REFERENCE TO RELATED APPLICATIONS

This application is a continuation-in-part of U.S. Provisional Application Ser. No. 60/034,450, filed Dec. 30, 1996, and entitled, Use of Caller ID for Security Identification of Backup Configurations, and Priority ISDN and POTs Backup.

BACKGROUND OF THE INVENTION

1. Field of the Invention

The present invention generally relates to telecommunication networks, and more particularly to a system and method for providing a robust telecommunication network having enhanced security and integrity.

2. Discussion of the Related Art

Presently there is a need for enhanced security and integrity in a telecommunications network, while at the same time promoting and maintaining a flexible and robust communications network.

In recent years, there has been a proliferation in digital telecommunication systems, and frequently, high capacity users define the endpoints of a telecommunications network. Service providers, local area networks, and private branch exchanges (PBXs), are all examples of such high capacity users. Typically, the incoming/outgoing network link connected to such high capacity users includes a high capacity trunk line, such as a T1 or DS line, which may interconnect with various other users, through, for example, a point-to-point connection or a frame relay network. As is known, such networks provide for high capacity throughput.

There are, however, various shortcomings in the present state of the art, including the handling of fault detection, security, and call prioritization. Mechanisms are well known for identifying and notifying a user of a line breakage or other fault condition existing in the link between endpoints. However, endpoint equipment often responds by rerouting all data on a particular line, as opposed to on the affected data. For example, suppose one endpoint of a telecommunications network interfaces to a local area network (e.g. a corporate network) and the telecommunications link communicating with the endpoint is a high capacity T1 line. If the endpoint detects a fault or breakage in any channel(s) of the T1 line, present systems operate to reroute the entirety of the data traffic across that T1 line through another port, whether that be a secondary T1 line or an alternative backup link. However, fractional or partial line faults are often encountered, making such a global rerouting of data wasteful and unnecessary. For example, data transmitted across a frame relay network (e.g., packet-switched data) often suffers only a partial fault, or a network breakage at some intermediate point across which only a portion of the data to the ultimate endpoint traverses.

Another shortcoming noted in present state of the art systems relates to security. In keeping with the previous example of telecommunications network endpoint being connected to a local area network, there is a tremendous need for providing a secured entry from any caller outside the local area network to access the network by way of, for example, a dial-up connection. Frequently security issues, such as this one, are handled by password protection. In such systems, dial-up users are required to provide a password for access to the network. The inherent problem with this type of security implementation is that passwords become discovered by outsiders, who then misuse the password to disrupt or corrupt the system (ie., the local area network).

Yet a further shortcoming of the present systems relates to the prioritization of calls, particularly in a bandwidth limited system. For example, in a plain old telephone system (POTS) or a basic rate interface integrated services digital network (ISDN-BRI). Access to the network is defined by a relatively narrow bandwidth, insofar as a large number of users might be concerned. In applications or systems such as these, it is important to provide a mechanism that allows incoming calls of higher priority to be accepted. Of course, this requires terminating an existing call, but more importantly requires the ability to detect the priority of an incoming call in relation to an existing call, which is presently a need that is largely unaddressed by presently known systems.

There is, therefore, a need in the industry for a method and apparatus for addressing these and other related problems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for establishing a backup communications link for rerouting data in a telecommunication network. In accordance with one aspect of the invention the method includes the steps of establishing a primary communications link between a calling party and a called party, and examining call setup information at the called party location to identify the telephone number of the calling party. Thereafter, the method stores the telephone number of the calling party. Upon identification of a fault condition in the communication link between the calling party and the called party, the method retrieves the stored telephone number of the calling party by the called party. Using the retrieved telephone number to dial the calling party back, the method then establishes a backup communications link. Alternatively, the method could use the identified telephone number of the calling party to identify a backup number (different that that called from) to call back when establishing the backup link.

In accordance with the invention, the primary communications link may be a T1 link, an ISDN link, DDS, DSL, or a POTS link. The link may be a point-to-point link, a permanent virtual circuit, a packet-switched frame relay circuit, or other similar link. Preferably, the system utilizes a lookup table or other database to store party profile information, which may include security information or call priority data. The caller identification number of the calling party is used to access/index such a table or database.

In accordance with another aspect of the present invention, a method for establishing a secured telecommunications link between a calling party and a called party is provided. In accordance with this aspect of the invention, the method includes the steps of receiving a calling from a remote user, identifying the caller identification number, and using caller identification number to access a lookup table. The method further includes the steps of determining whether a profile exists in the lookup table that corresponds to the identified caller identification element. If so, the method further confirms from information provided in the lookup table, whether that user is entitled to access the system. If so, then the method directs the system to establish the connection with the remote user. In a preferred embodiment, the system may provide an added level of security by requiring the remote user to enter a password, as well.

Preferably, this aspect of the invention includes the steps of receiving a signal from a calling party that is requesting the establishment of a communication link, and examining call setup information within the received signal for the second calling party to identify the telephone number of the second calling party. The method further includes the steps of accessing a memory storage area using the telephone number of the second calling party to retrieve information relating to the calling party, and evaluating security data of the retrieved information. If the security data permits the establishment of a connection, then the method establishes a communication link with the calling party.

In accordance with yet another aspect of the present invention, a method is provided for prioritizing the establishment of telecommunication links. In accordance with this inventive aspect, the method includes the steps of establishing a first communication link with a first calling party and receiving a signal from a second calling party that is requesting the establishment of a second communication link. Then, the method examines call setup information for the second calling party to identify the telephone number of the second calling party, and accesses a memory storage area using the telephone number of the second calling party to retrieve information relating to the second calling party. The method then evaluates the retrieved information, and allocates resources in accordance with the evaluated information.

In a preferred embodiment, the step of allocating resources includes the step of assessing the priority of the second calling party with respect to the first calling party. More specifically, the step of allocating resources includes the step of terminating the first communication link if the second calling party has a higher priority and the system resources do not support both the maintenance of both communication links simultaneously.

In accordance with yet a further aspect of the present invention, an apparatus is provided in association with a called party for controllably establishing a communication link with remote equipment associated with a calling party. The apparatus includes receiving means for receiving a signal from a calling party requesting the establishment of a communication link, and examining means for examining call setup information included in the received signal, the call setup information including the telephone number of the calling party. The apparatus further includes a memory storage area for storing calling party information, and means for accessing and evaluating information stored in the memory storage area.

DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
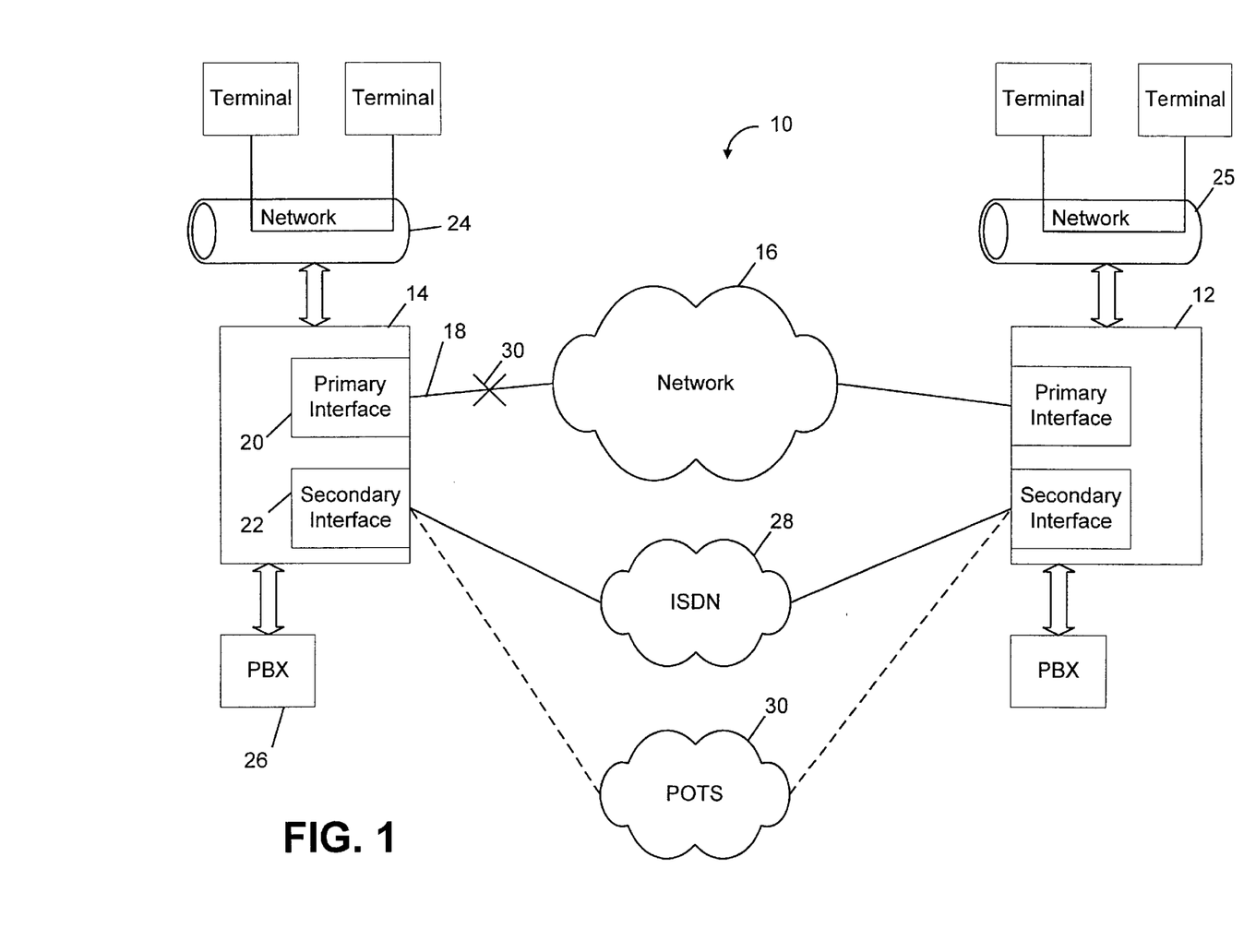
FIG. 1 is a top-level system diagram illustrating a dial backup feature of the present invention.

Turning now to the drawings, FIG. 1 depicts a top-level system diagram, illustrating a dial backup feature for the present invention. More specifically, FIG. 1 generally illustrates a telecommunications network system, generally designated by reference numeral 10, which connects a first or calling endpoint 12 and a second or called endpoint 14, in communication across a network 16. For purposes of the invention, the network 16 could be a plain old telephone system (POTS) network, an ISDN network, a frame relay network, or virtually any other telecommunication network. The link 18 connecting the endpoint 14 to the network 16 may, for example, be a T1 trunk, which is capable of handling high capacity data throughput.

For purposes of illustration, each endpoint 12 and 14 includes a primary interface 20 and a secondary interface 22. The primary interface is configured to interface with the primary network link 18, while the secondary interface 22 is designed to interface with a backup line, as will be described in more detail below. It will be appreciated that the primary interface 20 and secondary interface 22 need not necessarily be separate and distinct modules, but are depicted that way for purposes of illustration. In one application of the present invention, the endpoint 14 may be a node in, for example, a corporate environment. In this regard, it may communicate with a local area network 24 and/or a private branch exchange (PBX) 26.

In accordance with one aspect of the present invention, the system 10 provides a means and method for establishing a backup link between the endpoints 12 and 14, in the event that a fault (either total or partial) occurs in the telecommunication link between endpoints 12 and 14. In the illustrated embodiment, it is assumed that link 18 is a high capacity line, such as a T1 trunk. The backup link could, likewise, be provided over an ISDN-PRI line, or alternatively over a slower speed line such as an ISDN-BRI 28 or a POTS 30. What is important for purposes of this aspect of the present invention, is that the called endpoint 14 is able to identify the calling endpoint, in order to establish a backup link. As will be described below, this is accomplished by utilizing the caller identification, or caller ID, feature transmitted to the called endpoint 14.

By way of example, suppose a calling party at endpoint 12 initiates a call to endpoint 14. In a manner that is know and understood in the prior art, assume this call gets routed across a telecommunication link through network 16. Then assume a breakage or fault occurs along the link 18 at 30. Utilizing any of a number of means and methods that are well known in the prior art, the endpoint 14 may detect this fault, and upon fault detection initiate its fault handling or dial backup routine. In this regard, the endpoint 14 utilizes the caller ID information that was transmitted to it at the establishment of the connection with called party 12. As is known, this caller ID information, unless blocked, is inserted by the first central office (i.e., the central office adjacent endpoint 12) in the link between endpoint 12 and endpoint 14. The endpoint 14 may utilize this caller ID number to access, for example, a lookup table or other database where it may retrieve pre-stored information about the user at endpoint 12. In this regard, it will be assumed that some prior knowledge (which is stored in the lookup table or database) is known about the user at endpoint 12.

For example, in one environment, the entities at endpoints 12 and 14 could be corporate affiliates that communicate regularly across the network 16. In this way, corporate employees that are attached to the network 25 at endpoint 12 may communicate with corporate employees that are attached to the network 24 at endpoint 14. If, for example, the network 16 is a frame relay network and the dial backup instituted by endpoint 14 is to take place across the same frame relay network, then it may be necessary for endpoint 14 to re-map data link connection identifiers (DLCIs), which identify all multiple logical connections to be multiplexed over the same channel. That is, in a frame relay environment, the caller ID may be mapped via the lookup table to a preferred set of DLCIs which, in the event of a fault, may be re-mapped. Alternatively, the caller ID information may be mapped to logical IP addresses, in the event that endpoint 14 is a router. The essence, of this aspect of the invention is the use of the caller ID information to define (by way of a database or lookup table) a backup or alternative dial up connection.

In accordance with another aspect of the present invention, caller identification information is utilized for purposes of enhancing system security. As previously mentioned, prior art systems are known for implementing password protection in order to employ some means of system security. In this regard, a caller calling into an endpoint, for example, 14 may be required to input a password in order to access the system. However, anyone that may learn this password could gain unauthorized access to the system. This type of password protection becomes increasingly suspect in multi-point, enter-connecting networks 16, where password information transmitted across the network becomes increasingly susceptible to unauthorized detection. Therefore, as an added means of protection, a system constructed in accordance with one aspect of the present invention may employ caller ID information as a sole or secondary means of security. In this regard, a given endpoint, for example, 14 would be preconfigured to accept calls only from certain predefined users, and more specifically, from predefined endpoints for backup purposes. Since caller ID information is inserted at a local exchange, rather than a user endpoint itself, this mechanism for security is less susceptible to deceit or failure. Of course, as an added means of protection, a system endpoint could require not only that a call be placed from particular caller ID locations, but also that the calling party enter an appropriate password, as a secondary level of security and protection.

Another aspect of the present invention relates to the use of caller ID information in connection with prioritization. While the varying needs and circumstances that give rise to the need for being able to prioritize calls are too numerous to mention, suffice it to say that it is often desirable for an endpoint to be able to prioritize end coming calls. This is particularly true when there is a limited bandwidth for transmission across the primary channel of communication. For example, consider a small business that operates, but does not have the need to justify the expenditure for a high volume TI line. Instead, it may purchase an ISDN line, or even more economically one or two POTS lines. This company, however, may deem calls received from a particular location to be of utmost importance, for whatever reason, and therefore want the ability to, if necessary, terminate an existing call in order to accept an incoming call from that pre-determined or preidentified location. Certainly, if the incoming channel has sufficient bandwidth to accept an incoming call without terminating any existing calls, then it may be desirable to do so. For this reason, this aspect of the present invention has increased utility in limited bandwidth situations.

In a more complex environment, an endpoint may have a predetermined or predefined list of calling identification locations, each of which receive independent priority. A first calling location my have priority over a second calling location, which may have priority over a third calling location, and so on. Depending on the calls that are presently in place upon receipt of an incoming call, this system will determine, based upon a list of predefined priority, whether to terminate a presently existing call, and if so which one. A feature known as call waiting/caller identification is presently known in connection with POTS transmissions. This feature may be utilized by the present invention (assuming the link 18 is a POTS link or backup link) to identify the incoming caller and determine whether to establish connection with it, at the expense of a presently existing call.

By way of illustration, consider the situation where a calling party calls a called party and then, during that call, receives a call. If an evaluation of the caller ID information reveals to the calling party that the incoming call is from the called party, the calling party would understand that there must have been a fault in the connection between the parties and therefore the called party is calling for purposes of establishing a backup. Therefore, this incoming call would be treated as a high priority call, and the presently outgoing call would be terminated in order to receive the incoming call.

The foregoing features highlight the various aspects of the present invention and will be discussed in more detail below. In regard to the dial backup aspect of the present invention, reference is now made to FIG. 2, which shows a software flowchart illustrating this aspect. Upon receiving an incoming call, (step 40) the system strips from that call request, the caller ID information and utilizes that information to establish the call (step 42). In this regard, the caller ID information may be used for purposes of security and/or prioritization, as will be discussed in more detail below. Assuming these threshold inquiries are met, then the system connects the call in step 44. The call then proceeds, in a manner that is well known. If no fault occurs and the call is terminated by normal means (either endpoint relinquishing the call), then the system will disconnect (step 46) and wait to receive the next incoming call request. If, however, during the duration of the call, a fault is detected (step 48) then the system will access the internal database or lookup table, based upon the caller identification information, to receive information that defines a backup link (step 50). This information will vary depending upon the medium or network across which the backup link is to be made. For example, if routers define the endpoints, then the backup information will include an IP address. Alternatively, if the backup is established across a frame relay network, then DLCIs will define the backup link. Once the system retrieves this information, then at step 52 it establishes a backup connection and exchanges whatever information necessary and appropriate with the original calling party to reroute only the relevant data over the backup link.

Figure 3:
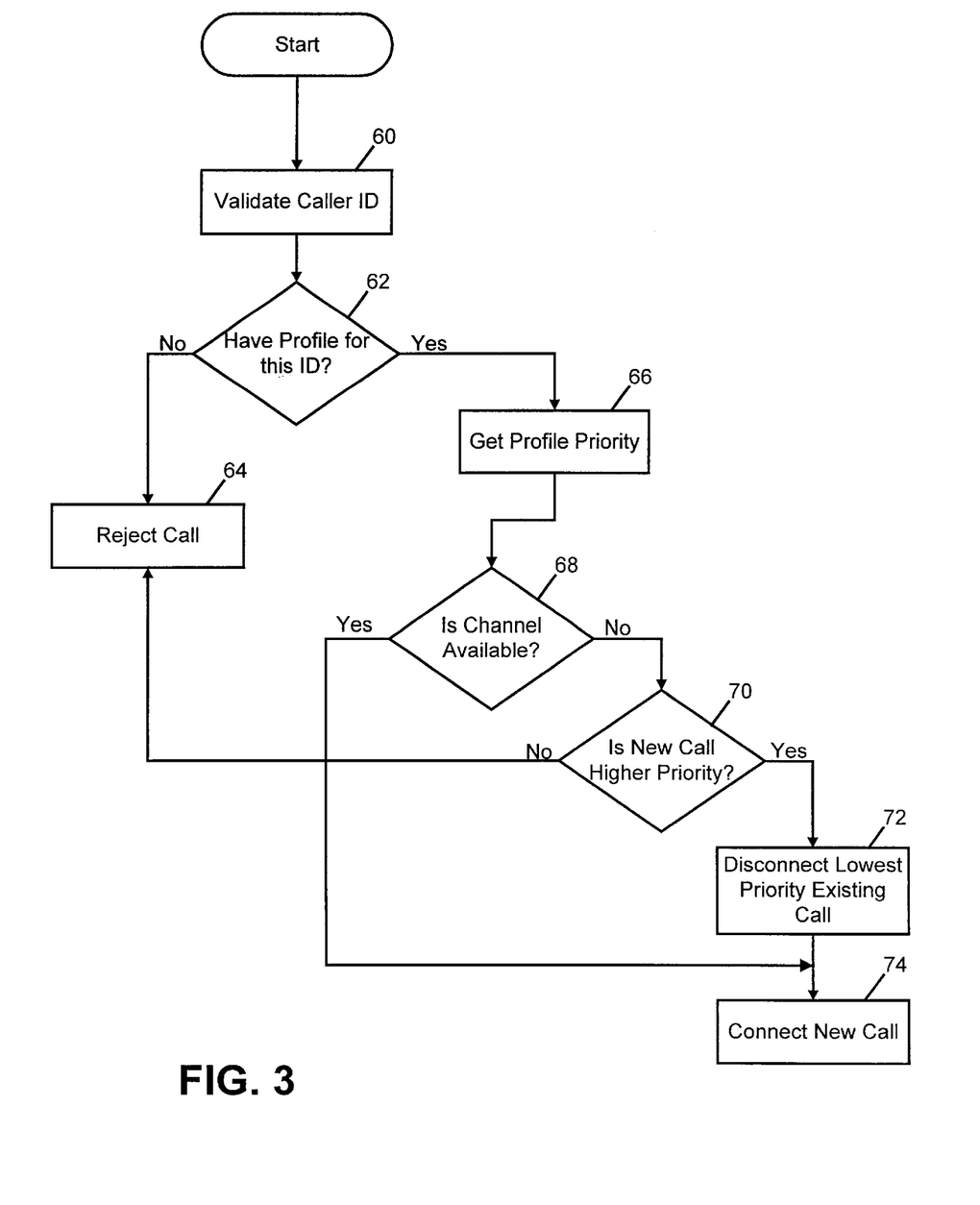
FIG. 3 is a software flowchart illustrating steps in an embodiment implementing the prioritization aspect of the present invention.

Turning now to FIG. 3, a flowchart is provided that depicts the top-level operation of the prioritization aspect of the present invention. Specifically, upon receiving an incoming call, the system validates the call by way of identifying the caller ID (at step 60). This validation step, having been briefly described above, will be described in more detail in connection with FIG. 4. Upon validating the caller ID, the system then determines from an internal database (at step 62) whether it has a prioritization profile for this particular caller ID. If not, it rejects the incoming call (step 64). Alternatively, although not illustrated, the system of a preferred embodiment may first check to see whether the incoming line/link has sufficient bandwidth to support the incoming call. If so, it may accept the call after the step 60 validation. Of course, in such an embodiment any such accepted calls that do not have a profile are the first to be terminated once the bandwidth on the incoming link is exhausted.

In keeping with the description of FIG. 3, if the system detects a valid profile for the caller ID of the incoming call, then it retrieves a profile for that call (step 66). It then checks to determine, based upon the bandwidth of the incoming link, whether a channel is available to accept the call (step 68). If not, this system (at step 70) determines whether the incoming call has a higher priority than any of the existing calls. If not, then the incoming call is rejected (step 64). If so, however, the system will disconnect or terminate the connection with the lowest priority existing call (step 72) and establish connection with the incoming call (step 74). If the system had previously established connection with calls, not having a priority profile, then those calls will be deemed as having the lowest priority, and therefore the first calls to be terminated at step 72.

Figure 4:
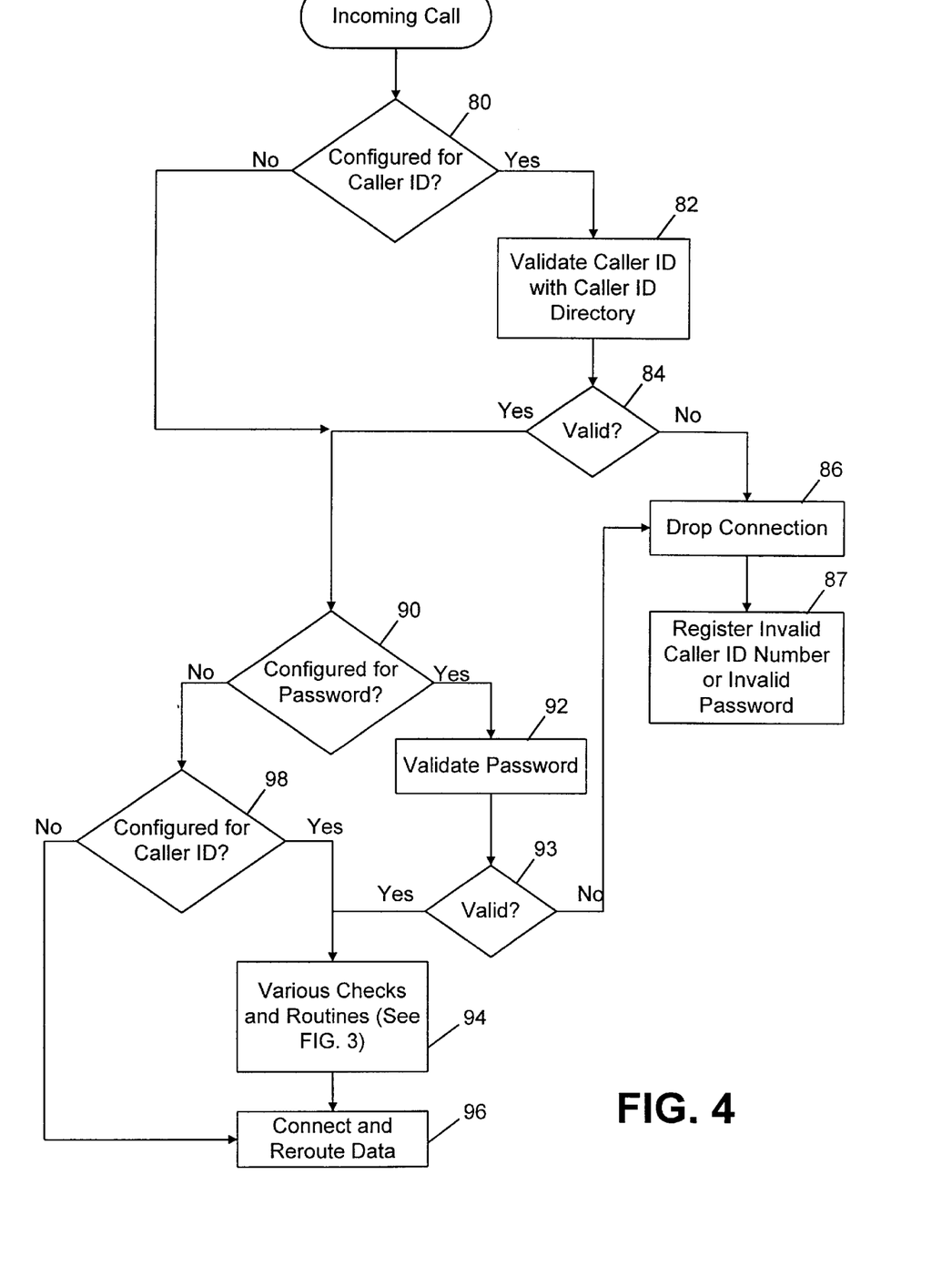
FIG. 4 is a software flowchart illustrating steps in an embodiment implementing the enhanced security aspect of the present invention.

Referring now to FIG. 4, a top level software flowchart illustrates the security aspect provided by the present invention, in conjunction with the caller ID information. Entry into any of the steps of this flowchart assumes that the Auto Answer feature of a modem or other communicating device is enabled. Otherwise, the system would not answer incoming calls.

Upon receiving an incoming call, the system looks to determine whether it is configured for caller ID (step 80). This step is provided only because caller ID is not necessarily supported in all geographic locations, by cellular phones, or some pay telephones. If the system is configured for caller ID, however, then the system (at step 82) validates the caller ID from a caller ID directory, or other internal lookup table or database. From such database, the system determines whether the caller ID of the incoming call is known and therefore valid (step 84). If not, the connection is dropped (step 86) and the system may be configured to log the entry attempt from an invalid or unregistered caller ID number (step 87). If, however, the caller ID is validated at step 84, then the system auto answers the call (step 88).

As illustrated, if the test of step 80 resolved to NO, or after execution of the auto answer element 88, the system proceeds to step 90 where it determines whether the system is configured for password access. If so, the system proceeds to step 92 where it validates the password with a password directory or lookup table. If valid (step 93), then the system proceeds to block 94 where it may perform other checks and routines, such as the prioritization routine discussed in connection with FIG. 3, before establishing the connection at step 96. If, however, step 92 determines that the entered or received password is invalid, then the system proceeds to step 86 where it drops the connection. If, at step 90, the system is not configured for password protection, then it proceeds to step 98 where it again checks to confirm whether the system is configured for caller ID. If not, the system may proceed to connect with the incoming call (step 96). Alternatively, if configured for caller ID, then the caller ID validation has already occurred at steps 82 and 84, so that system may proceed to step 94.

Figure 2:
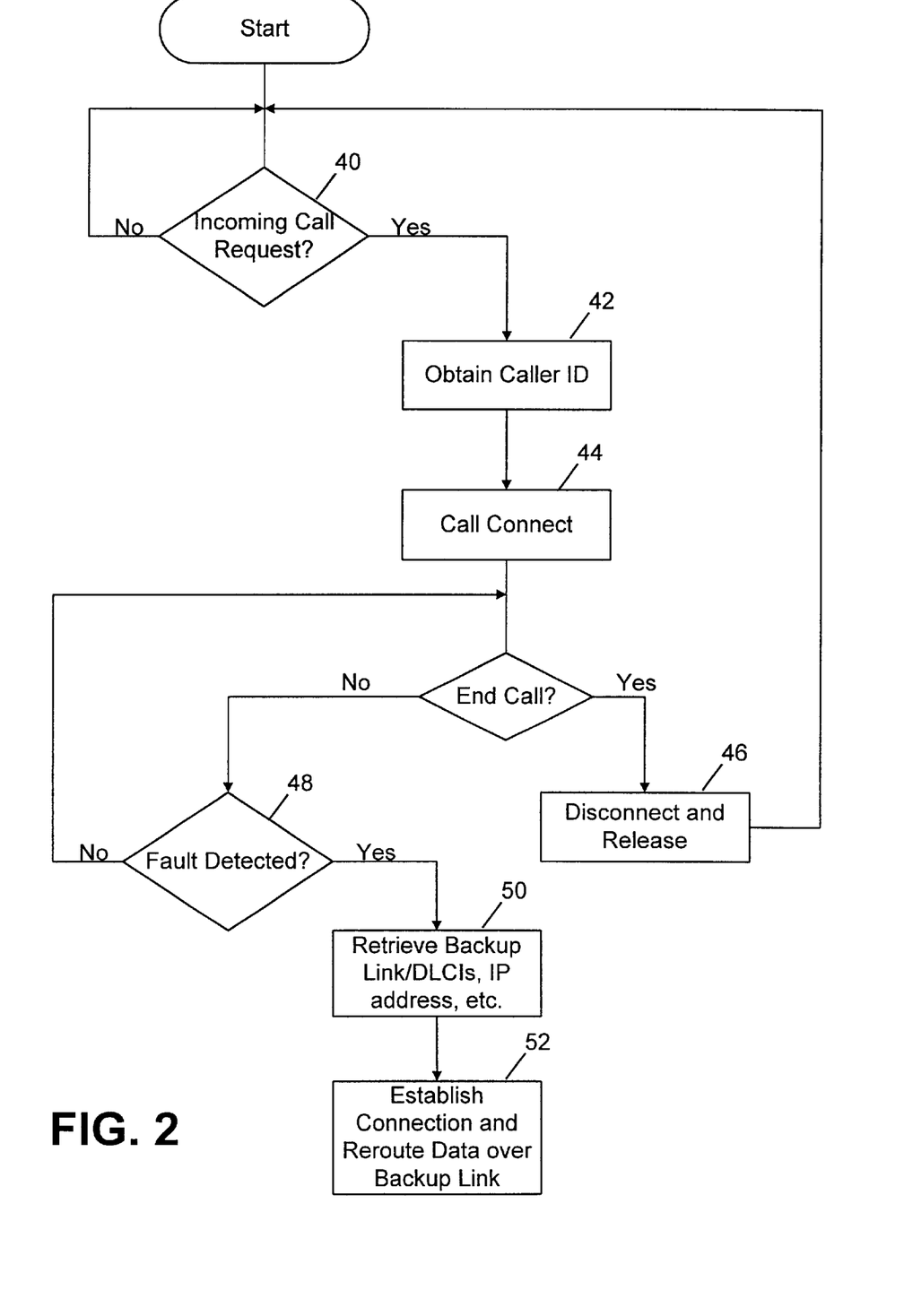
FIG. 2 is a software flowchart illustrating steps in an embodiment implementing the dial backup aspect of the present invention.
Figure 5:
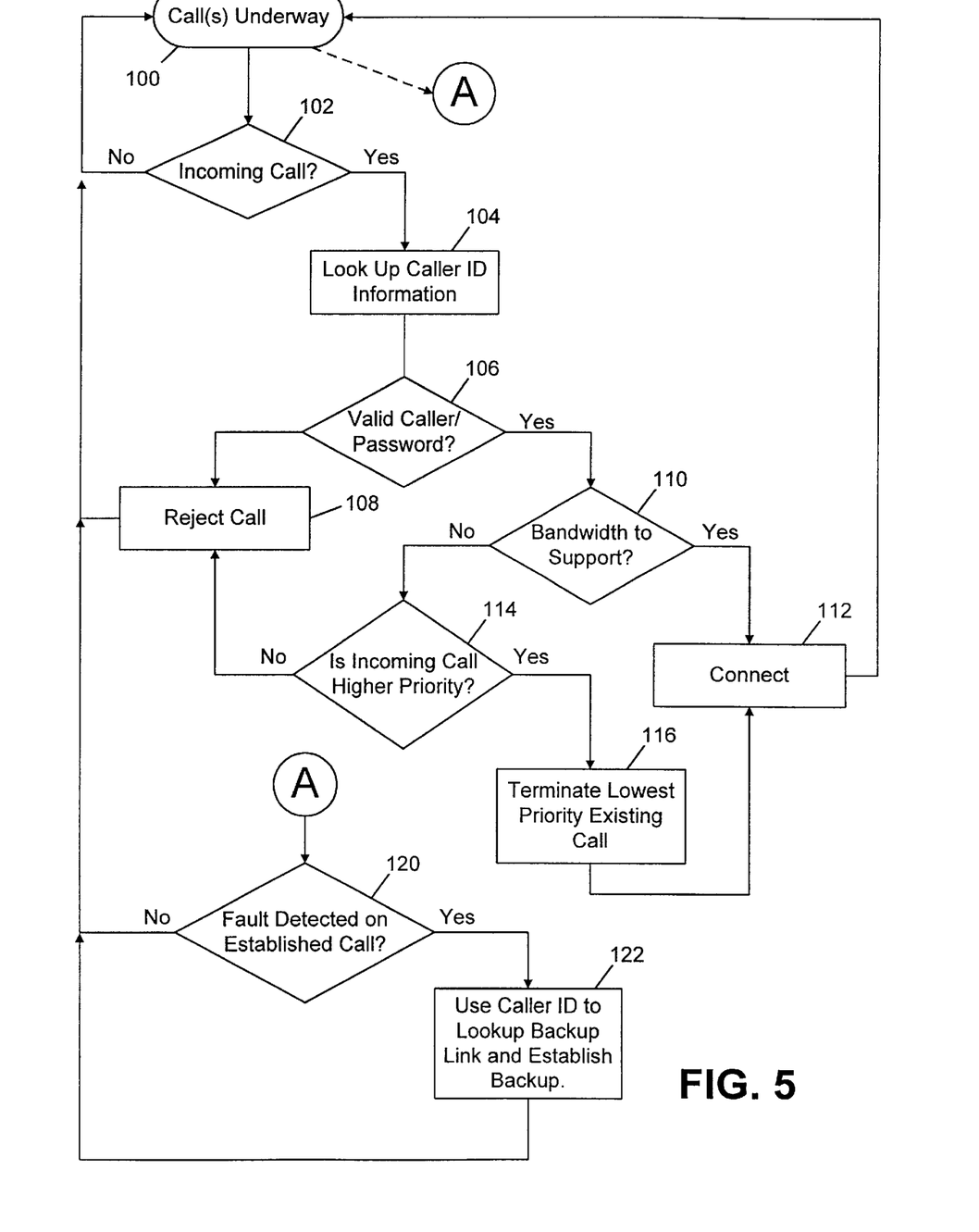
FIG. 5 is a top-level software flowchart illustrating steps of an embodiment implementing the combined functionality of the various aspects of the present invention.

Turning now to FIG. 5, the top level concepts described in FIGS. 2–4 are combined and illustrated in a unitary software flowchart. The first illustrated step is step 100, which assumes the system is operating in a steady state fashion with one or more calls underway. As illustrated, two different events can take the system out of this state. The first is the receipt of an incoming call, and the second is the identification or detection of a transmission fault. Upon receipt of an incoming call (step 102), the system obtains the caller identification information and, through its internal lookup table or database, looks to see if the caller is listed as a valid caller (step 104). The system may also employ password protection. The system then determines whether this caller is one that has a valid access to the system and/or checks for a received password to determine whether system access should be granted (step 106). If the caller and/or password is invalid, then the system (at step 108) rejects the call. Otherwise, if the caller is a valid caller, it proceeds to step 110 where it determines if the bandwidth on the incoming/outgoing telecommunication link will support the additional caller (e.g., whether a channel is available). If so, then the system proceeds to step 112 where it establishes a connection with the incoming call and returns to step 100. Otherwise, the system accesses the database to determine whether the incoming call has or is assigned a higher priority than in any of the presently existing calls (step 114). If not, the system may return to step 108 and reject the incoming call. If, however, the incoming call is assigned a higher priority than one or more of the existing calls, then the system terminates the lowest priority existing call and proceeds to step 112 where it establishes the connection with the incoming call, where it can reroute data over the backup link, and thereafter returns to step 100.

As previously mentioned, the second event that leads the system to depart from step 100, is the detection of a fault on an established communication link. If a fault is detected (step 120), then the system accesses the internal database according to the caller ID of the caller on the distant end of the communication link that is corrupt. Based upon the caller ID, the system retrieves from its database the relevant information for establishing a backup link to the caller (step 122). It then establishes that connection, by way of backup link, and returns to step 100.

Figure 6A:
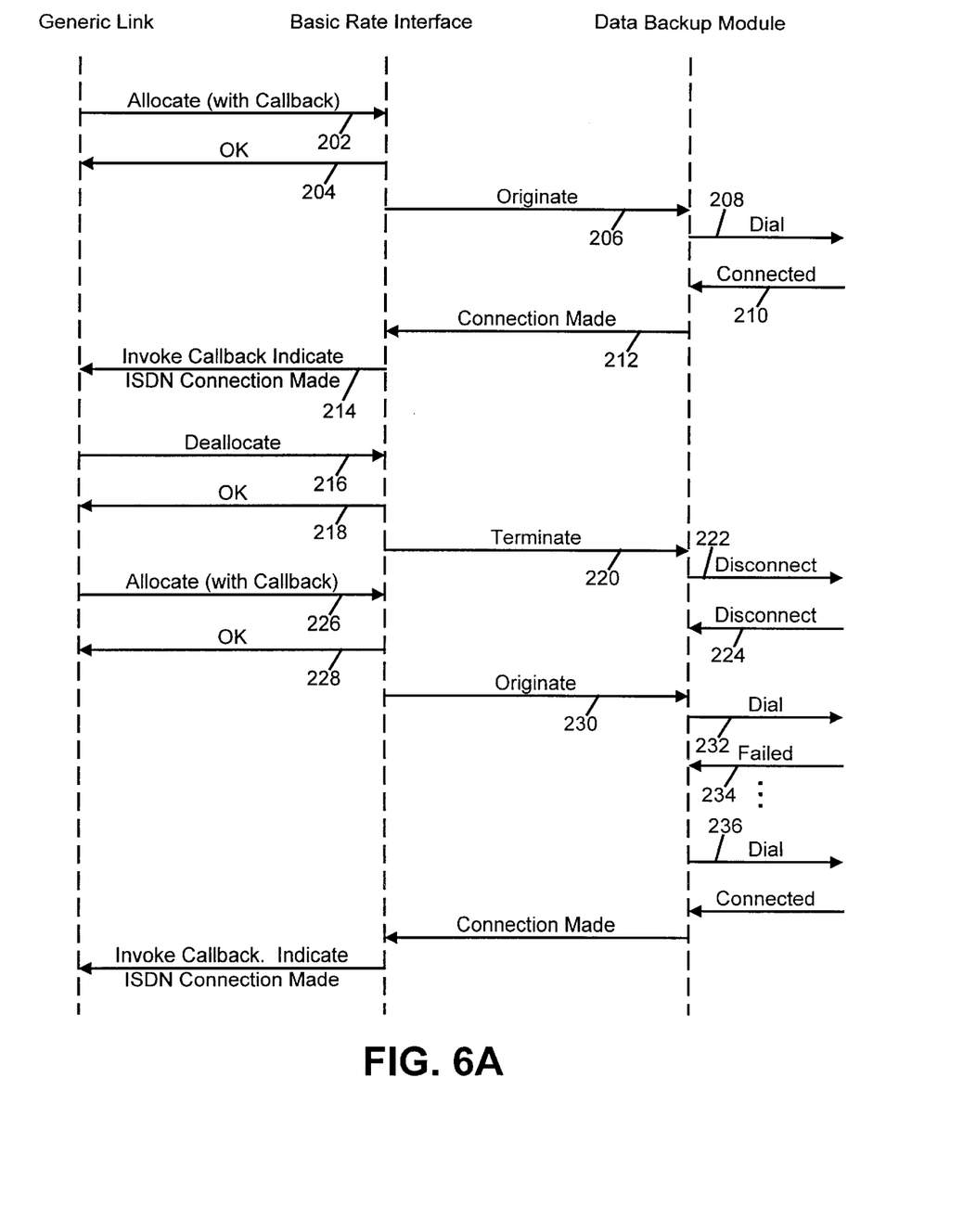
FIGS. 6A and 6B are timing diagrams illustrating the allocation and deallocation of call originating and call answering peers.
Figure 6B:
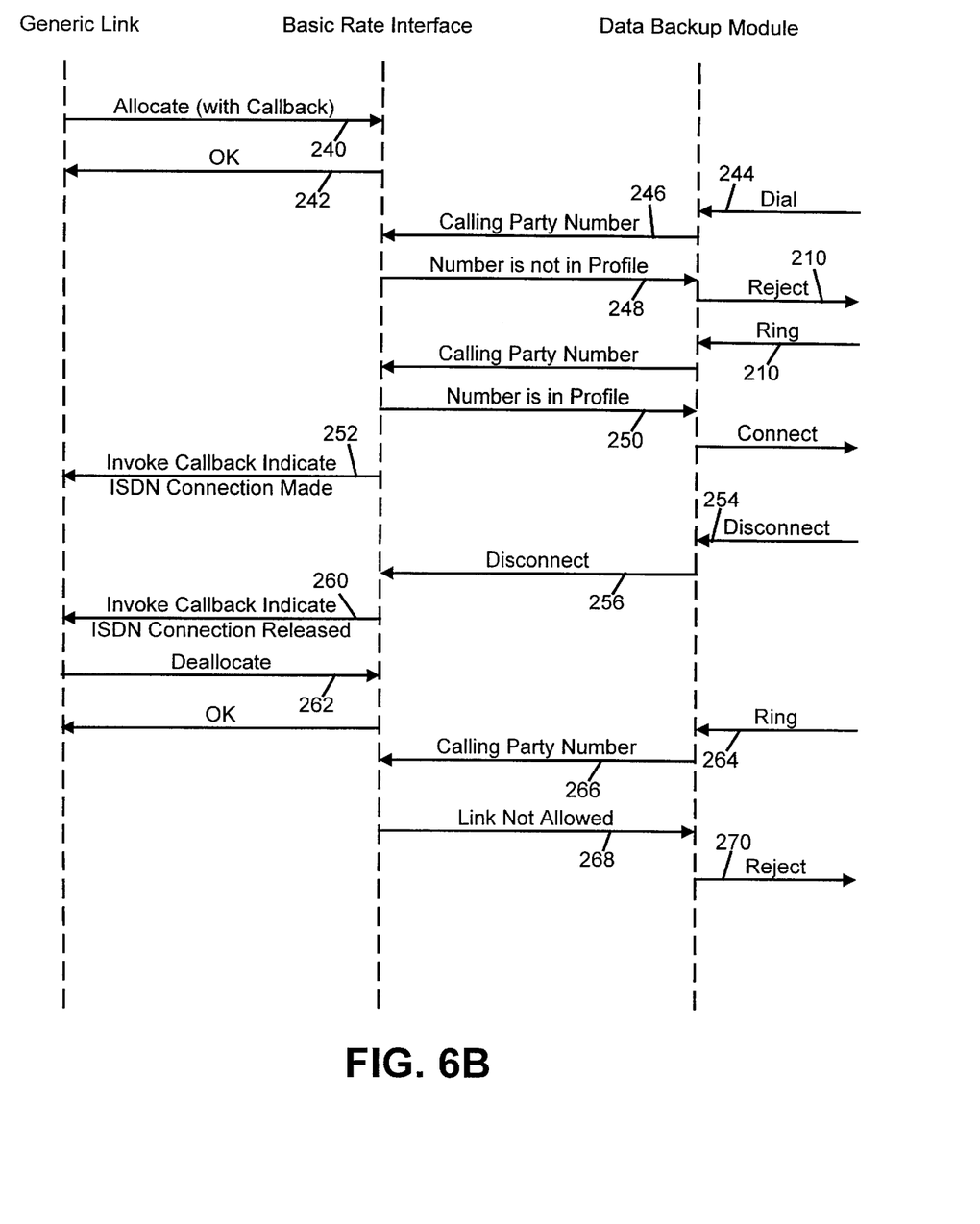

Reference is now made to FIGS. 6A and 6B which illustrate timing aspects of the present invention in connection with both the origination of a call and a receipt or answering of a call. Specifically, FIG. 6A illustrates the allocation/deallocation of an originate peer among a generic link, a basic rate interface (to an ISDN link) and the data backup module. Beginning with an allocate command 202 sent from the generic link to the basic rate interface, an acknowledge or OK signal 204 is returned, then the basic rate interface transmits an originate request 206 to the data backup module which dials 208 over the link and establishes a connection 210. Upon receiving indication that the connection is established, the data backup module then transmits to the basic rate interface a connection made signal 212, which basic rate interface then transmits an invoke callback message 214 to the generic link and indicates that an ISDN connection has been made. Upon deallocation, the generic link transmits to the basic rate interface a deallocate signal 216, which is acknowledged 218. The basic rate interface then transmits a terminate signal 220 to the data backup module, which then transmits a disconnect signal 222 to disconnect the established link.

Once the generic link has received the acknowledgment 218 from the basic rate interface, acknowledging the generic link deallocate signal, then the generic link may again transmit an allocate signal 226 to the basic rate interface, which is acknowledged 228 as before. Similarly, after the link has been disconnected, then the basic rate interface can transmit an originate signal 230 to the data backup module, which, as described before, dials 232 to establish a connection over an ISDN line, for example. If, however, this dial backup fails 234, the data backup module may wait a predetermined period of time and then attempt to redial 236. This sequence is repeated until a connection is established or, alternatively, until a predetermined number of attempts have failed. The sequence then continues as described above.

Turning to FIG. 6B, a timing diagram is illustrated that depicts the allocate/deallocate sequence of an answer pier in accordance with the dial backup aspect of the present invention. Beginning with an allocate signal 240 transmitted from the generic link to the basic rate interface, which is acknowledged 242, the data backup module receives a ring signal 244 across, for example, an ISDN line. This ring signal 244 is generated (presumably) from a remote caller seeking to establish a backup link. The data backup module extracts the caller identification information to ascertain the calling party number and transmits 246 that to the basic rate interface. The basic rate interface rate then, by accessing a lookup table, determines whether that number is stores within a database, lookup table, or other profile. If not, it transmits a signal 248 back to the data backup module accordingly, which rejects the incoming call. If, however, the number is in the profile, then an appropriate signal 250 is transmitted back to the data backup module which establishes a connection. The basic rate interface also transmits an invoke callback signal 252 to the generic link, indicating that an ISDN connection is made.

At some time later, the data backup module receives a disconnect signal 254 from the remote caller, which data backup module then propagates a disconnect signal 256 to the basic rate interface, which then transmits an invoke call back signal 260 to the generic link indicating that the ISDN connection is now released. If the generic link transmits a deallocate link signal 262 to the basic rate interface, such signal 262 informs the basic rate interface that a channel is not available for connection. Thus, if the data backup module receives a ring signal 264 from a remote user, upon transmitting 266 the calling party number from the data backup module to the basic rate interface, the basic rate interface will respond 268 that a link is not allocated, and the data backup module will reject 270 the incoming call.

The forgoing timing diagrams have been provided for purposes of illustration, and will be appreciated by those skilled in the art upon an examination of the information disclosed herein.

Figure 7A:
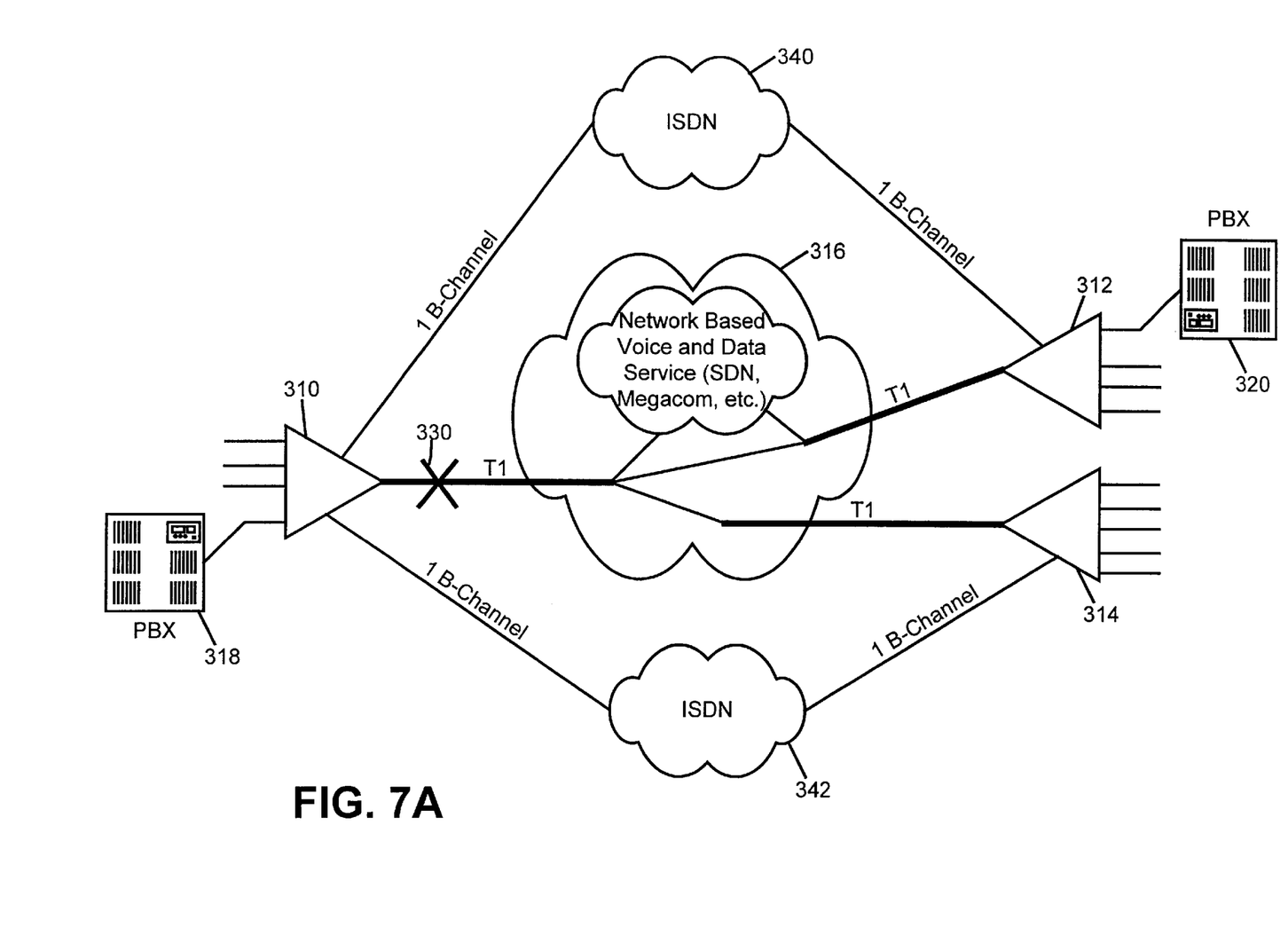
FIGS. 7A–7D depict various embodiments and operating environments illustrating the concepts and teachings of the present invention.

FIGS. 7A–7D various embodiments and environments are shown, implementing the concepts and teachings of the present invention. Turning first to FIG. 7A, an embodiment is illustrated having three connection endpoints 310, 312, and 314. Each of these connection endpoints communicate across a network 316 by way of T1 trunk lines. End points 310 and 312 are internally connected to private branch exchanges 318 and 320 and may further be connected to other devices such as local area networks.

FIG. 7A illustrates a total break or fault 330 in the T1 line of endpoint 310. As a result, the entirety of the data incoming or outgoing to/from endpoint 310 will be terminated. Thus, the backup link(s) must reroute the entirety of this data. In this regard, FIG. 7A illustrates a dual-channel reroute of data. One channel is rerouted over one B channel of a first ISDN network 340, and a second channel is rerouted over another B channel of the same or a second ISDN network 342. Alternatively, the two backup links could be routed through frame relay networks, POTS, or otherwise. The significance, with respect to the invention, is that the endpoint 310 recognized the need to rechannel information to/from endpoints 312 and 314 independently.

Figure 7B:
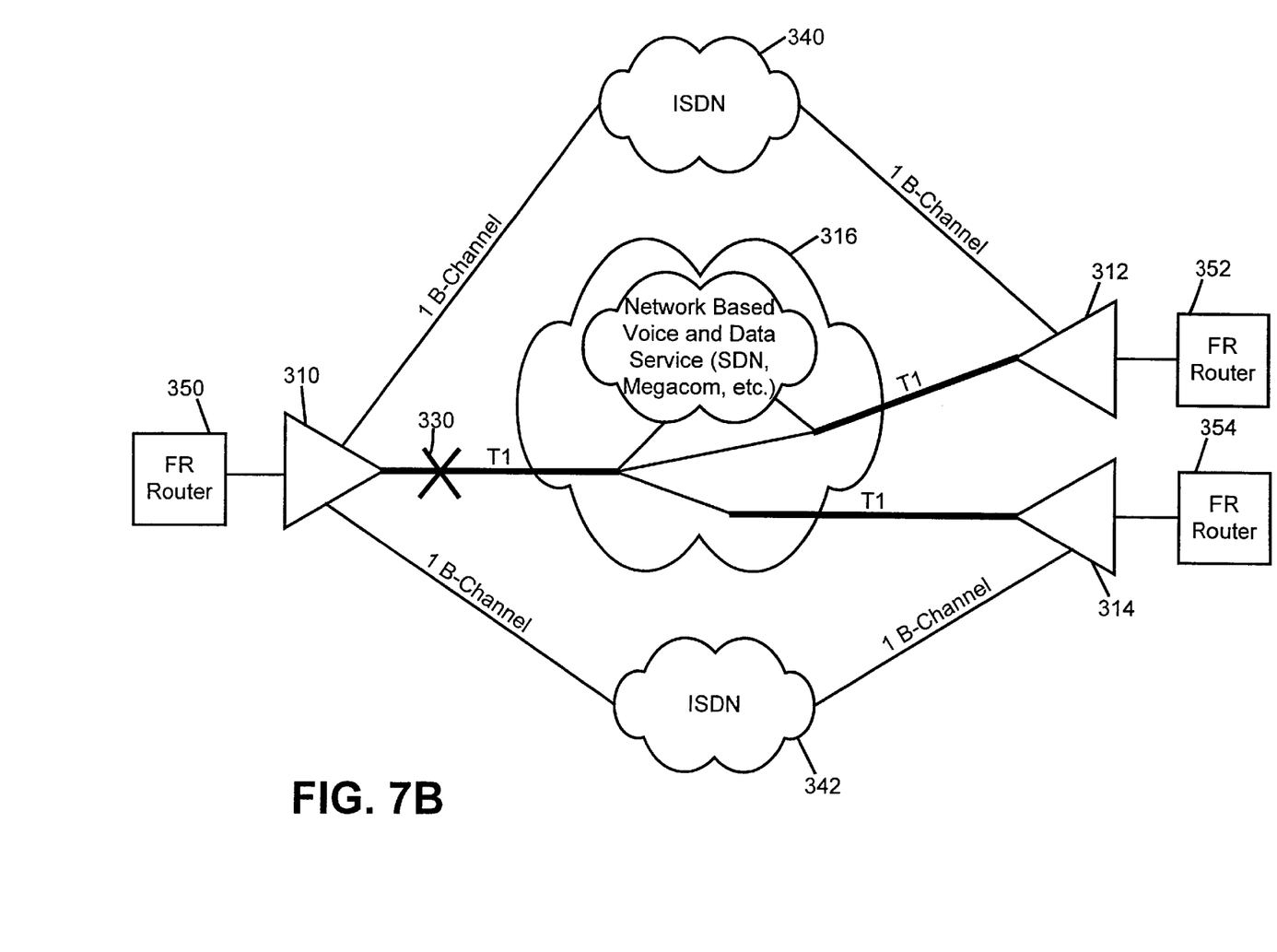

A similar illustration is provided in FIG. 7B, except that instead of endpoints 310, 312 and 314 being connected to PBXs or LANs, each are connected to frame relay routers 350, 352 and 354. In this environment, in order for endpoint 310 to reroute data traffic and establish backup links to endpoints 312 and 314, it must remap the DLCIs associated with endpoints 312 and 314.

Figure 7C:
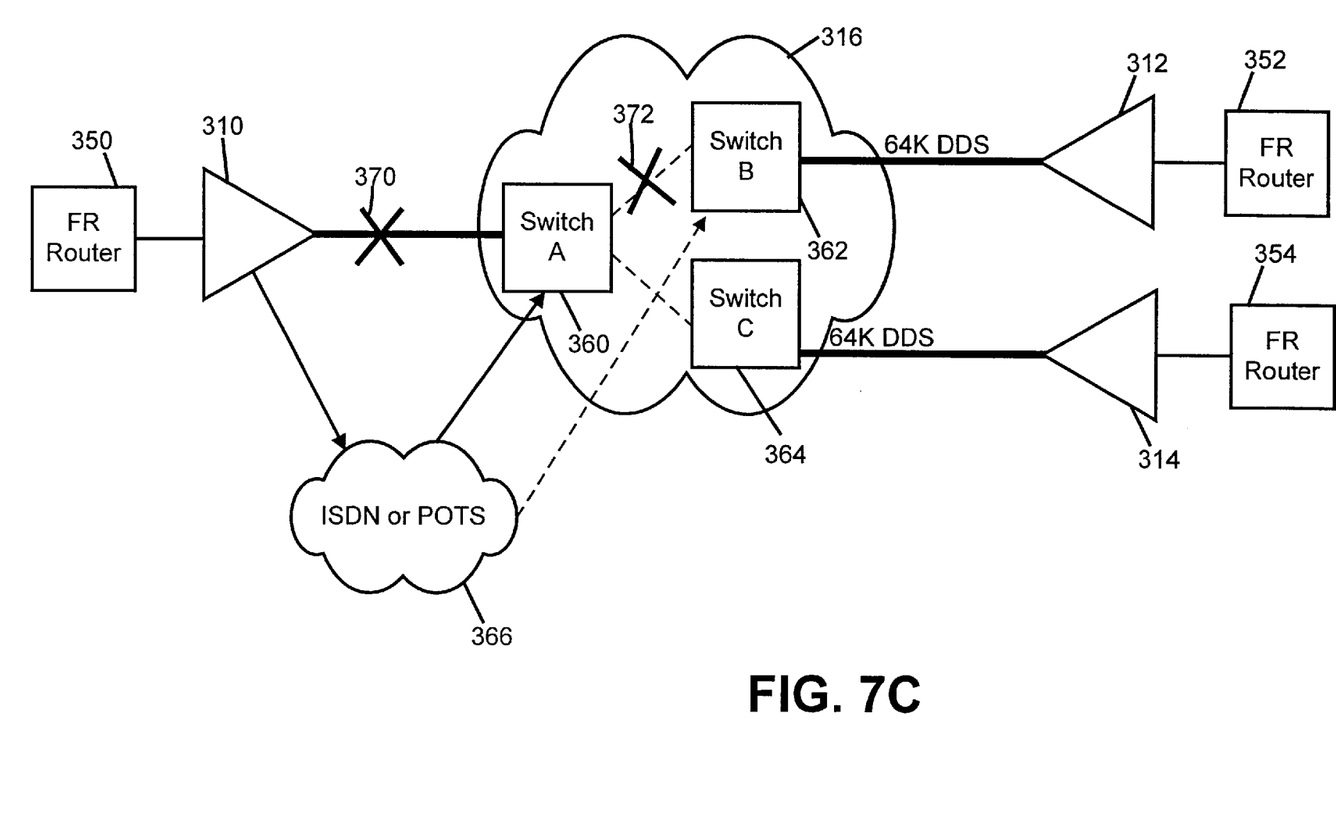

FIG. 7C illustrates a similar embodiment depicting the ability of one aspect of the present invention to establish backup links to accommodate a partial rerouting of data. More specifically, FIG. 7C illustrates a frame relay network 316 with switches 360, 362, and 364, through which different virtual circuits are going to different destinations. Some of the virtual circuits may be experiencing fault or link difficulties while others may not, depending upon where the fault or breakage occurs. For example, a breakage at 370 may be accommodated by rerouting data from endpoint 310 to switch 360. This rerouting may be done in a manner previously described through an alternative frame relay network, an ISDN, a POTS 366, or otherwise. Alternatively, if the breakage occurs at 372, between switch 360 and 362, data may be rerouted from switch 360 to 362 by way of switch 364. Generally, when establishing a backup link in this environment, the data path identifiers, or DLCIs, may need to be remapped to enable the backup to occur properly. Occasionally, however, the packet switches inside the network may provide a redundant backup destination or switch interface used to avoid problems in the network. If such a redundant interface is set up to provide the same virtual path interface as the primary switch, no additional remapping needs to be done. The backup switch is then responsible for rerouting the data correctly onto the network.

Figure 7D:
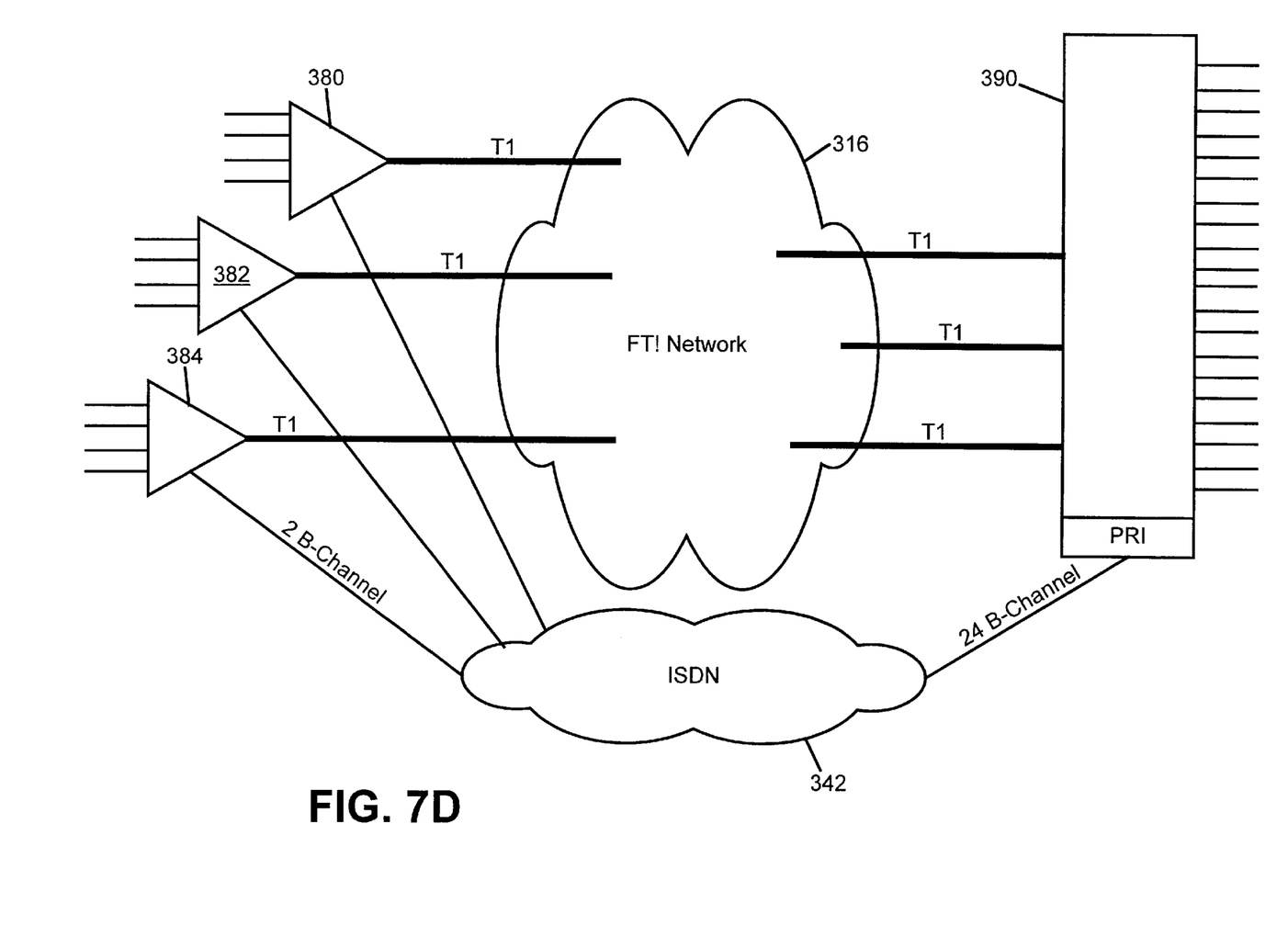

FIG. 7D illustrates potential backup links between endpoints 380, 382, and 384 with a central site 390. Each of the endpoints 380, 382, and 384 may employ a basic rate interface, utilizing the two B channels of an ISDN for purposes of the backup configuration, while the central site 390 may employ a primary rate interface having twenty-four B channels for establishing backup links through and ISDN 392. The manner and protocol of identifying faults in establishing these links may be accomplished in accordance with the teaching described above, and need not be repeated.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for prioritizing the establishment of telecommunication links comprising the steps of:

establishing a first communication link with a first calling party;

receiving a signal from a second calling party requesting the establishment of a second communication link, while the first communication link is active;

examining call setup information for the second calling party to identify the telephone number of the second calling party;

accessing a memory storage area using the telephone number of the second calling party to retrieve information relating to the second calling party;

evaluating the retrieved information; and allocating resources in accordance with the evaluated information such that the first communication link may be terminated automatically based on the evaluated information.

2. The method as defined in claim 1, wherein the first communication link is an ISDN link.

3. The method as defined in claim 1, wherein the first communication link is established as a point-to-point T-1 link.

4. The method is defined in claim 1, wherein the call set-up information includes caller ID information.

5. The method as defined in claim 1, wherein the first communication link is established as a permanent virtual circuit across a frame relay network.

6. The method as defined in claim 1, wherein the step of allocating resources includes the step of assessing the priority of the second calling party with respect to the first calling party.

7. The method as defined in claim 6, wherein the step of allocating resources includes the step of terminating the first communication link if the second calling party has a higher priority and the system resources do not support both the maintenance of both communication links simultaneously.

8. The method as defined in claim 1, wherein the step of allocating resources includes the step of establishing a second communication link.

9. The method as defined in claim 1, wherein the first communication link is established over a link selected from the group consisting of:

a T1 link;

a DDS;

a DSL link;

an ISDN link; and a plain old telephone service (POTS) link.

10. The method as defined in claim 1, wherein the memory storage area is a look-up table.

11. The method as defined in claim 1, wherein the memory storage area is a database.

12. The method of claim 1, further comprising the step of identifying a fault condition in the established communication link.

13. The method of claim 12, wherein the step of identifying a fault condition includes identifying a condition selected from the group consisting of:

a total fault condition; and a partial fault condition.

14. The method of claim 12, further comprising the steps of:

retrieving a telephone number of the second calling party;

using the retrieved telephone number to dial the second calling party back, in response to identifying a fault condition in the second communications link; and establishing a backup communications link with the second calling party from the called party.

15. A computer readable storage medium containing program code for executing a method for controllably establishing a backup communications link for rerouting data comprising the steps of:

establishing a first communication link with a first calling party;

receiving a signal from a second calling party requesting the establishment of a second communication link, while the first communication link is active;

examining call setup information for the second calling party to identify the telephone number of the second calling party;

accessing a memory storage area using the telephone number of the second calling party to retrieve information relating to the second calling party;

evaluating the retrieved information; and allocating resources in accordance with the evaluated information such that the first communication link may be terminated automatically based on the evaluated information.

16. An apparatus associated with a called party for controllably establishing a communication link with a remote apparatus associated with a calling party comprising:

means for receiving a signal from a calling party requesting the establishment of a communication link;

means for receiving a signal from a second calling party requesting the establishment of a second communication link, while the first communication link is active;

means for examining call setup information for the second calling party to identify the telephone number of the second calling party;

means for accessing a memory storage area using the telephone number of the second calling party to retrieve information relating to the second calling party;

means for evaluating the retrieved information; and means for allocating resources in accordance with the evaluated information such that the first communication link may be terminated automatically based on the evaluated information.

17. The apparatus of claim 16, further comprising means for establishing a backup communication link in response to a fault condition being detected in the established communication link.

* * * * *

UNITED STATES PATENT AND TRADEMARK OFFICE
CERTIFICATE OF CORRECTION

PATENT NO.      : 6,269,149 B1
DATED           : July 31, 2001
INVENTOR(S)     : Hassell et al.

Page 1 of 1

It is certified that error appears in the above-identified patent and that said Letters Patent is hereby corrected as shown below:

<u>Drawing</u>,
Existing Fig 4 is replaced with the following corrected Fig 4:

FIG. 4

Signed and Sealed this

Second Day of April, 2002

Attest:

*Attesting Officer*

JAMES E. ROGAN
*Director of the United States Patent and Trademark Office*